Jan. 25, 1955     W. F. BAKKE     2,700,281
MILK COOLER
Filed April 29, 1950     2 Sheets-Sheet 1
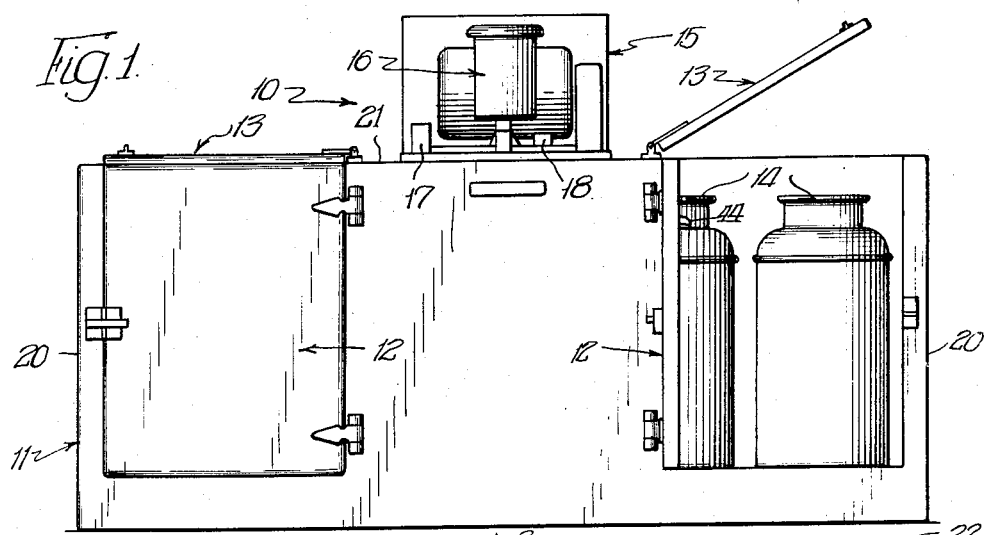
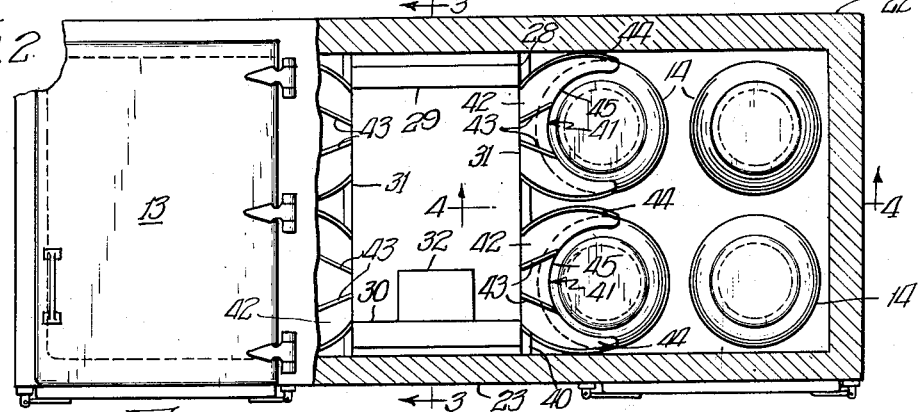
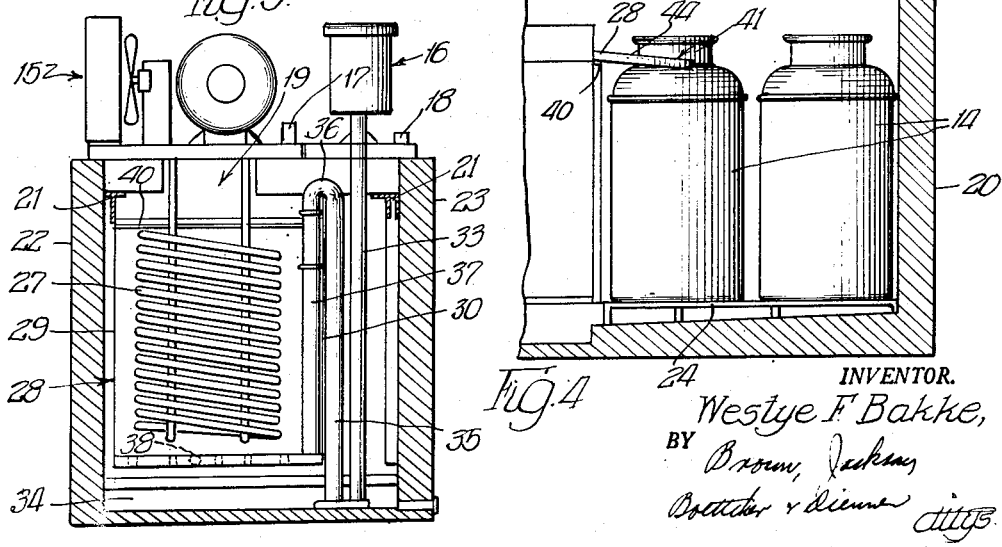
INVENTOR.
Westye F. Bakke,
BY Brown, Jackson,
Boettcher & Dienner
ATTYS.

Jan. 25, 1955 W. F. BAKKE 2,700,281
MILK COOLER
Filed April 29, 1950 2 Sheets-Sheet 2
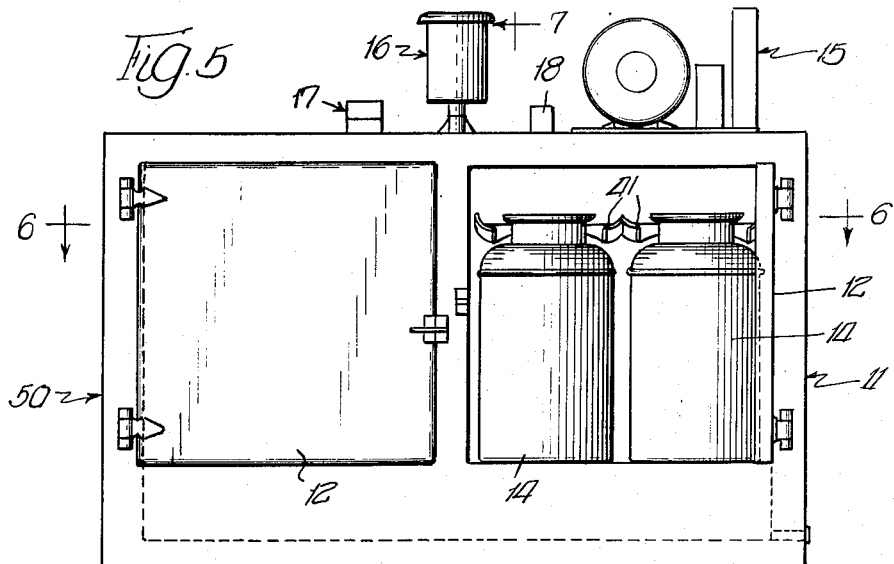
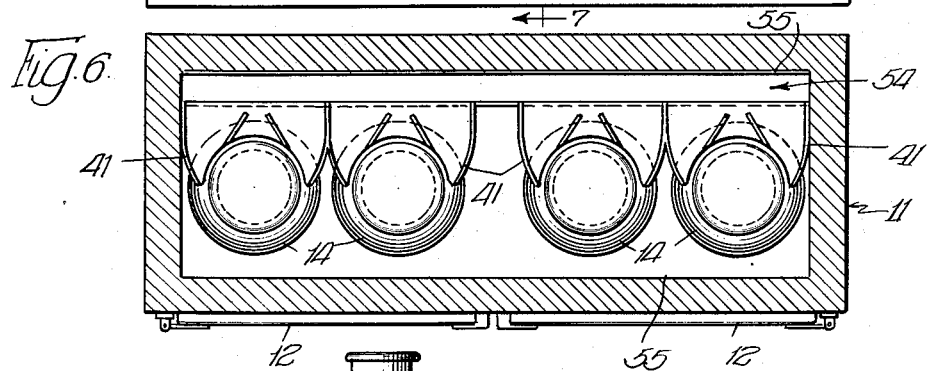
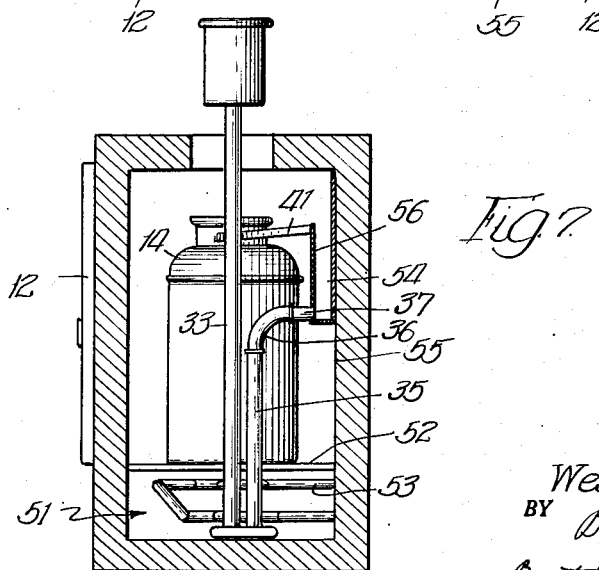
INVENTOR.
Westye F Bakke,

United States Patent Office

2,700,281
Patented Jan. 25, 1955

2,700,281

MILK COOLER

Westye F. Bakke, Madison, Wis., assignor to Sub-Zero Freezer Company, Inc., Madison, Wis., a corporation of Wisconsin Application April 29, 1950, Serial No. 159,107

2 Claims. (Cl. 62—141)

My present invention is primarily concerned with a refrigeration or cooling device for the cooling of milk in large storage cans of the type normally employed by farmers for shipping milk to a dairy plant or the like.

More particularly my invention is directed to an improved and simplified milk cooler in which refrigerated water is spilled or cascaded gravitationally over the sides and neck of milk storage cans to bring about a more efficient and effective cooling system than has heretofore been known in the art.

With the advent of pasteurized milk, the necessity of controlling the bacteria count in fresh milk became very important. The farmer, in order to meet the requirements and standards adopted for health protection by pasteurizing plants and municipal health boards, was faced with the problem of keeping the milk, daily produced by his cows, at a bacteria count sufficiently low to meet health standards and to enable the pasteurizing plant to economically produce a saleable and safe pasteurized product. The scientific answer to this problem is found in refrigeration of the milk immediately after it is taken from the cows.

One of the earliest methods developed by the farmer to meet his milk cooling needs, was the utilization of a well-house in which the milk cans were stored in a vat of cool well water. In warmer weather it was often necessary to use ice to keep the temperature of the well water down. Later with the introduction of electricity to the farm, electrical refrigeration was employed to cool the water in the well-house. Still more recently the farmer has been able to purchase various types of insulated refrigeration units in which milk in storage cans may be cooled. One of the most popular of these refrigeration units employs a method of cooling in which the refrigerated water is sprayed over the milk cans and the water recirculated and passed over a suitable refrigeration coil prior to being sprayed over the cans again. It is this latter type of insulated box refrigeration unit to which the changes and improvements which constitute my invention are applicable. One of the most objectional features of the spray type of cooler is the excessive time necessary to effect a thorough and satisfactory cooling of the milk in the can.

Briefly my invention contemplates an enclosed insulated refrigerator box having suitable access doors therein and in which there is located a cooling tank adapted to receive a removable refrigerating coil unit and a circulating pump unit. The tank is designed to be filled with water which is cooled by the refrigerating coil. The milk cans, of course, are arranged within the box in a suitable manner. As the circulating pump delivers more and more water to the tank, the water continually spills over designated sides of the tank to be delivered around the neck of the cans by suitable yoke spillway members from whence it may spill over the cans to cover their sides and cool their contents. This cascaded spilling of the ice water over the cans causes a rapid cooling due to the rapid delivery of a satisfactory volume of cooling water. The water of course is picked up again from the bottom of the box and reintroduced to the cooling tank by the circulating pump.

It is the main object of my invention to disclose a milk cooler in which milk cans or the like are adapted to be rapidly and efficiently cooled by continuously cascading refrigerated water over the cans.

It is a further object of my invention to disclose a milk cooling unit in which the refrigerating and circulating systems are removable as separate units for repair or the like.

It is a still further object of my invention to disclose a unique type of delivery yoke spillway adapted to deliver the refrigerated water from a cooling tank to a milk can where the water is evenly and effectively distributed over the exterior of the cans thereby effecting an efficient cooling of the cans' contents.

Still another important object of my invention is to disclose a gravitational type water cooler in which the milk cans are covered with cold water above the top level of the milk within the can so that maximum cooling takes place in the zone above the milk line toward which the heat of the milk is continuously rising, thus effecting rapid cooling of the milk.

These and further objects and features of my invention will become readily apparent from time to time as the following detailed specifications and descriptions proceed. Now in order to acquaint those familiar with this art as to the mode of constructing and utilizing my invention reference is made to the accompanying drawings in which:

Figure 1 is a front elevational view of an eight-can milk cooling unit made in accordance with the teachings of my invention;

Figure 2 is a top plan view, with parts broken away in section, of the unit shown in Figure 1 showing the arrangement of the cooling unit and milk cans within the unit's interior;

Figure 3 is a cross sectional end view taken substantially along line 3—3 of Figure 2 looking in the direction of the arrows and showing the detailed arrangement of the cooling tank and associated parts;

Figure 4 is a partial cross sectional view in front elevation taken substantially along line 4—4 of Figure 2;

Figure 5 is a front elevational view similar to Figure 1 showing a modified form of my invention adapted to cool four cans of milk at one time;

Figure 6 is a top plan cross sectional view taken along line 6—6 of Figure 5 showing the internal tank and milk can arrangement of the unit shown in Figure 5; and Figure 7 is a cross sectional end view similar to Figure 3 showing the internal tank and cooling coil arrangement of the unit shown in Figures 5 and 6.

Looking now at Figure 1 of the drawings it will be seen that my eight-can cooler 10 therein illustrated, comprises generally an insulated cabinet 11, having front doors 12 and top doors 13 whereby milk cans 14 may be conveniently loaded into the cabinet's interior. A refrigerating unit 15, circulating pump 16 and timer 17 and temperature control thermostat 18 are conveniently and removably mounted centrally on top of the cabinet directly above a cascade cooling unit 19, shown in Figure 3, which is housed within the cabinet.

The cabinet 11, as illustrated in Figure 1, is the eight-can type and is shown in its preferable form as a substantially rectangular box having end walls 20, a top wall 21, a rear wall 22, and a front wall 23 all constructed with a suitable exterior and interior finish and having an insulating material inserted within their hollowed interior in a manner suitable and conventional in refrigeration art. It will be noted that the front doors 12 swing outwardly from the front wall 23 to allow the removal and introduction of milk cans to the cabinet's interior without the necessity of raising them a great distance from the ground level. Additionally, the top doors 13 swing upwardly from the top wall to aid the user in installing the cans within the cabinet's interior. The particular style cabinet shown herein is adapted to hold eight standard 10 gallon milk cans at a time, four of which may be subjected to simultaneous cooling and four of which may be placed in a standby position adjacent the cans being subjected to the cooling water from the cascade unit 19 disposed centrally in the cabinet. The cabinet of course is constructed with a water tight interior and is adapted to have a suitable grid or platform 24 mounted along its bottom for supporting the cans, as seen in Figure 4.

The refrigerating unit 15 is detachably mounted on top of the top wall 21 of the cabinet 11 intermediate the two top doors as is shown clearly in Figure 1. It has been found advantageous, in the eight-can type of cooler, to use a ½ H. P. Freon compressor which may be of any suitable type commercially available, such as a Servel hermetic type employing a standard 110 volt, 60 cycle, A. C., ¼ H. P. motor. The Freon compressor is adapted to compress Freon gas or like refrigerating medium to allow for its later expansion in a suitable cooling coil 27 which is adapted to be lowered within the interior of the cascade unit 19, shown in Figure 3.

The circulating pump 16 is mounted adjacent the refrigerating unit 15 on the top wall 21 of the cabinet and is herein shown as a conventional impeller type of pump capable of delivering approximately 42 gallons of water per minute, which volume has been found to be an effective water supply for cooling four 10 gallon milk cans at a time.

The timer 17 can be any conventional suitable clock style timer and is utilized in conjunction with a conventional temperature control thermostat 18 for the convenience of the user in economically operating the refrigerating plant of the cooler.

Coming now to the details of the cascade unit 19, shown in Figures 2 and 3, it will be noted that it is comprised essentially of an open top upright tank 28 having end walls 29 and 30 and sidewalls 31; the sidewalls being of lesser height than the end walls to thereby allow the water to selectively spill over the sidewalls as will become apparent presently. The interior of the tank is invaded by an inwardly extending rectangular channel 32 formed integrally with the front end wall member 30 for the reception of a vertical intake pump casing 33 which extends downwardly from the pump below the bottom of the tank to a sump well 34 which extends beneath the cooling tank 28. The sump or pump well communicates with the bottom interior of the cabinet below the platform members 24 thereby allowing the pump to recirculate the water which flows off of the cans and lift it from the bottom of the cabinet to the interior of the cooling tank through a return pipe member 35, thence through an elbow member 36 and down through a third discharge pipe 37 extending downwardly toward the bottom interior of the tank. The last mentioned discharge pipe 37 discharges the water into the lower portion of the tank so that the water circulates across the tank's bottom and up over the cooling unit 27. The above described pump assembly comprises a "drop in" unit of the pump, the motor and the piping which enables the entire unit to be lifted out of the well and tank for quick substitution or repair and to be dropped into the tank and well without the necessity of making or opening pipe connections.

Also extending into the tank and depending from the refrigeration unit 15 mounted on top of the cabinet, is the cooling coil 27 connected to the refrigeration unit 15. The Freon refrigerant from the compressor of the refrigeration unit is expanded in the cooling coil, which extends into the tank, thereby cooling water within the tank 28. This cooling coil arrangement is also of the "drop in" type so that this unit can likewise be lifted from the cabinet for quick and easy servicing without disturbing the cabinet. A drain spout 38 is provided near the lower limits of the tank's interior for draining the tank when it is desired to clean the cooler.

Outwardly extending flanges 40 integrally associated with the upper edge of each sidewall member 31 of the tank 28 are adapted for supporting yoke spillway members 41 which receive and distribute the water spilling over the sidewalls of the tank for delivery to the cans 14 thereby to effect rapid cooling.

The yoke spillways 41 are preferably made of cast aluminum or like material to prevent corrosion and rusting action by the water; the tank likewise being made of some corrosive resistant metal such as stainless steel or the like. As shown in Figure 2 each yoke comprises a central platform 42 having a pair of raised ridges 43 disposed suitably on its upper surface adjacent their connection with the tank for guiding the water across the spillway. Vertical flange member 44 borders the lateral edges of the upper platform to likewise act as a guiding member for directing the flow of the cooling water over the neck of a can which is adapted to be received within the yoke in a suitably curved cutout portion 45 formed in the upper platform to form a U-shaped yoke. When a milk can is mounted in the yoke, the neck of the can is substantially surrounded by the yoke so the cooling water is directed thereover in an evenly distributed stream by means of the guiding ridges 43 and side flanges 44. In the particular embodiment herein illustrated for use with my eight-can cooler, four yoke spillway members 41 are mounted on the cooling tank; two on each sidewall thereof extending angularly downward from the upper edges of the tank whereby four milk cans may be subjected simultaneously to the cascading effect of the cooling water at one time. Mounting of the tank to the cabinet member may be conveniently accomplished by means of bolts or the like insertable through the top wall of the cabinet and fastened to the tank through flange members 21 bordering the cabinet's rear and front end walls 22 and 23 respectively.

In operation the cooling tank is filled with water and the floor of the cabinet covered to a suitable depth to supply an adequate overflow supply for the recirculating pump. The cooling coil within the tank supplies the refrigerating means for maintaining the cooling water at the desired temperature. As the circulating pump supplies the tank with more and more water there is a continuous overflow along the tank's sidewall upper edges to supply the yoke members 41 with a steady supply of refrigerated, cooled water which flows downwardly along the yoke members to cascade over the neck of the milk cans above the normal milk line thereof. This latter feature allows for a more rapid cooling effect than if the water were merely spilled down the sidewalls of the can in that the heat of the milk naturally tends to rise to the top of the can and thus the neck zone is the warmest. Thus the flow of large quantities of water over the throat of the cans causes a rapid dissipation of the internal heat of the milk. The circulating pump delivers water to the bottom of the cooling tank through pipe 37 forcing the water to flow upwardly over the cooling coil in the tank which causes a more efficient and rapid cooling of the water. In normal operation, the eight-can cooler, herein illustrated, is designed to cool four cans of milk at a time by the cascading effect with four other cans being positioned in a standby position within the cabinet alongside the cans being cooled.

Figures 5 through 7 illustrate a modified tandem type of my cascading cooler adapted for cooling 4 cans of milk at one time. As is seen in Figure 5 the cabinet 50 therein illustrated is substantially similar to the cabinet 11 described above with the exception that there is an absence of the top doors 13. The circulating pump 16, timer 17, temperature control thermostat 18, and refrigerating unit 15 are again mounted on top of the cabinet. The cooling tank 51 in this form however is low and rectangular and is located along the bottom of the cabinet beneath the floor 52 thereof with a cooling coil 53 of the refrigerating unit being mounted therein. A rectangular leveling tank 54 runs along the interior rear wall 55 of the cabinet near its upper inner margin for distributing the cooling water to the various cooling stations. Yoke spillway members 41 are again adapted for distributing the cascading water over the milk cans 14 and are mounted adjacent a front wall 56 of the distributing leveling tank 54 for the reception thereof of the overflow from the leveling tank. The cooling water is pumped by the circulating pump 16, by a similar intake casing 33, return pipe 35, flexible elbow 36, and discharge pipe 37 from the cooling tank 51 in the bottom of the cabinet to the leveling tank 54 prior to it being cascaded over the milk cans.

Rapid cooling is again accomplished in the four can unit by cascading large volumes of water over the necks and sidewalls of the cans; in the manner heretofore described. Rapid cooling of the circulating water is also herein accomplished by circulating the return water over the cooling coil 53 in the cooling tank by means of the circulating pump. It will be readily recognized that this tandem type of cooler is adapted to various sizes for accommodating more or less than four cans at a time, for example six, without undue alteration.

Thus it may be seen that I have illustrated two forms of a milk cooler embodying the unique cascade principle of my invention by which it is possible to rapidly and efficiently cool a plurality of milk storage cans or the like by means of spilling large volumes of refrigerated water over the neck and sidewalls of milk cans so that the cans are substantially covered with a thin layer of chilled water at all times during the cooling operation.

I claim:

1. In a milk cooler of the class described, in combination, an insulated storage cabinet having access doors along one side wall thereof, an open-topped water tank mounted within said cabinet, a rectangular open-topped distributing tank mounted adjacent the upper edge of the other side wall of said cabinet, a refrigerating unit positioned atop said cabinet and having a cooling coil depending into said storage tank, a drop-in pump unit mounted through the top wall of said cabinet and adapted to pump water from said storage tank to said distributing tank, and a plurality of yoke spillway members mounted in tandem fashion along an upper marginal edge of said distributing tank and sloping downwardly therefrom for cascading large volumes of cooling water over the necks and sidewalls of milk storage cans positioned within said cabinet.

2. In a milk cooler of the type utilizing an insulated cabinet having associated therewith a refrigerating unit for cooling large quantities of water stored in a tank within the cabinet, a new and improved means for distributing said cooled water to the necks and over the side walls of a plurality of milk storage cans positioned upright within said cabinet, comprising a plurality of U-shaped yoke spillway members, each characterized by an open throated portion formed inwardly of one edge of a planar water distributing platform thereof, said spillways being mounted in side by side and downwardly inclined relation adjacent the open top of said tank so as to receive water over a side wall thereof and gravitationly distribute the same across the said distributing platform to the exterior of said cans, each can being positioned with its neck portion within the open throated yoke portion of one of said spillways to facilitate the delivery of water to the necks and side walls of the individual cans.

References Cited in the file of this patent

UNITED STATES PATENTS

| Number | Name | Date |
|---|---|---|
| 2,380,901 | Chamberlain | July 31, 1945 |
| 2,411,833 | McMahon | Nov. 26, 1946 |
| 2,455,162 | Donnelly | Nov. 30, 1948 |
| 2,482,579 | Duncan | Sept. 20, 1949 |
| 2,575,094 | Chamberlain | Nov. 13, 1951 |
| 2,618,127 | Shipman | Nov. 18, 1952 |